April 1, 1941. R. E. BALDWIN 2,237,268
RECORD CONTROLLED TYPEWRITING MECHANISM
Filed Oct. 26, 1939 13 Sheets-Sheet 1

Inventor
R. E. BALDWIN
by
Sydney R. Page
Attorney

April 1, 1941.  R. E. BALDWIN  2,237,268
RECORD CONTROLLED TYPEWRITING MECHANISM
Filed Oct. 26, 1939    13 Sheets-Sheet 3

Inventor
R.E. BALDWIN.
by
Sydney E. Page
Attorney

April 1, 1941.  R. E. BALDWIN  2,237,268
RECORD CONTROLLED TYPEWRITING MECHANISM
Filed Oct. 26, 1939  13 Sheets-Sheet 11

Inventor
R. E. BALDWIN.
by
Sydney E. Page.
Attorney

Patented Apr. 1, 1941

2,237,268

UNITED STATES PATENT OFFICE 2,237,268

RECORD CONTROLLED TYPEWRITING MECHANISM

Richard Everest Baldwin, Thornton Heath, England, assignor to Powers Accounting Machines Limited, London, England, a company of Great Britain Application October 26, 1939, Serial No. 302,397
In Great Britain October 26, 1938

1 Claim. (Cl. 197—20)

This invention relates to record controlled typewriting mechanism and has for its object to provide a construction of such mechanism which will operate relatively rapidly and which can be utilised for the printing on a record card of an interpretation of records contained in each column thereof.

According to the present invention a record controlled typewriting mechanism comprises in combination a plurality of pivoted type levers each bearing two or more characters, means for sensing a perforated record step by step, one column at a time, means operative under the control of means actuated, when any hole within a predetermined range of hole positions in a column is sensed, to select for operation a corresponding type lever, means operative, when a control hole in the same column is sensed, to shift the pivot for the type levers so that when the selected type lever operates, a different character strikes the printing surface, and means for actuating the selected type lever.

Preferably, the mechanism includes means whereby when the control hole alone is sensed, not only is the pivot for the type levers shifted, but also a type lever corresponding to said control hole is selected for operation, together with means whereby when another hole in the same column is contemporaneously sensed the means for selecting the type lever corresponding to the control hole is rendered inoperative.

If desired according to the present invention the typewriting mechanism may include means for sensing two control holes in a column, means whereby when either control hole is sensed alone, a type lever common to both control holes is selected for operation, together with means whereby when one control hole is sensed alone, the pivot for the type levers is shifted to a greater extent than when the other control hole is sensed alone, and means whereby when another hole in the same column is sensed together with either control hole the means for selecting the type lever corresponding to the control holes is rendered inoperative.

Constructions according to the invention are particularly intended for use in printing on a record card an interpretation of the records punched therein and an example of such a construction will now be described, with reference to the accompanying drawings in which—

Figs. 1 and 1A together constitute an elevation of the front of the machine,

Figs. 2 and 2A together constitute an elevation of the back of the machine,

Figure 7:
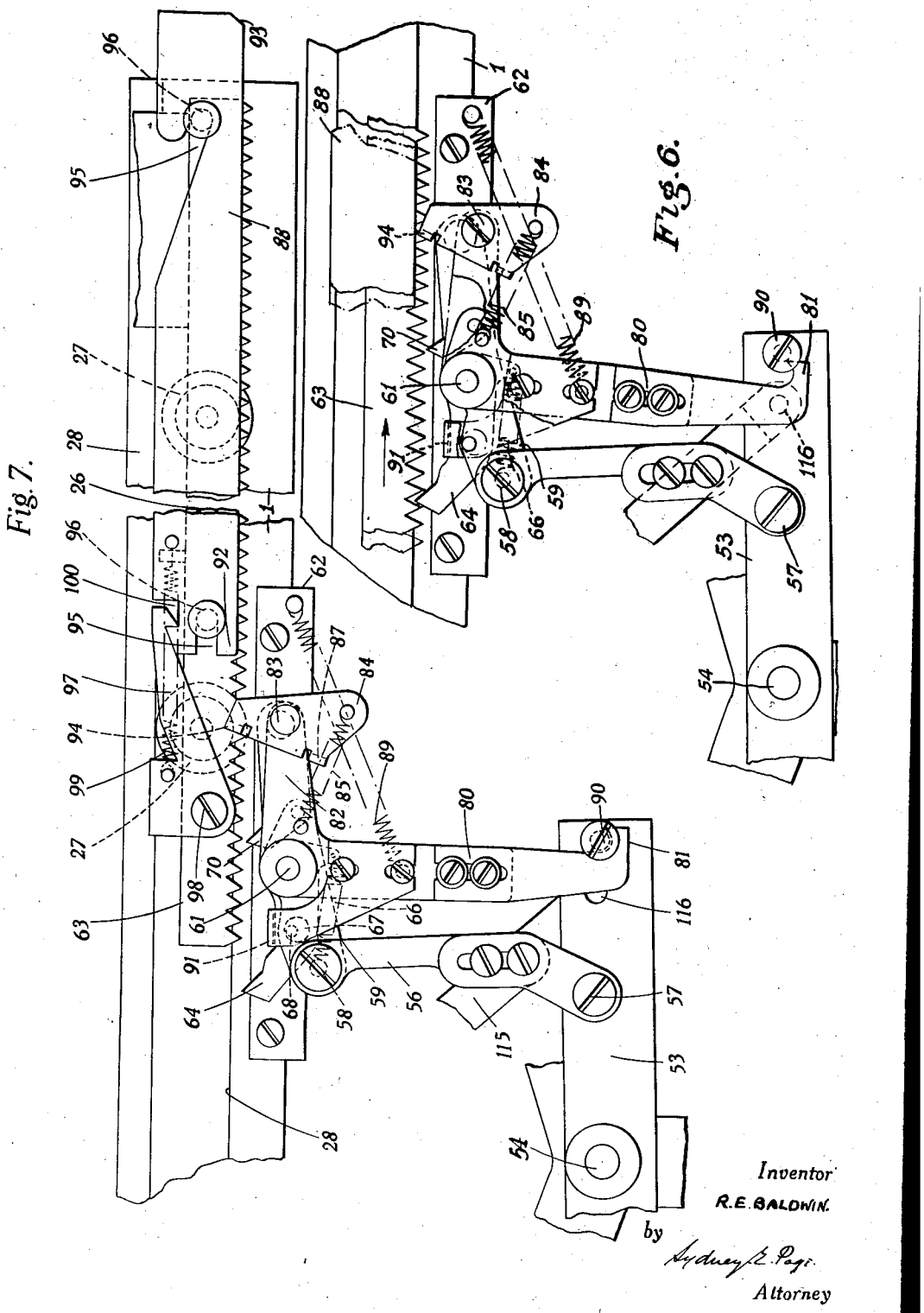
Figure 8:
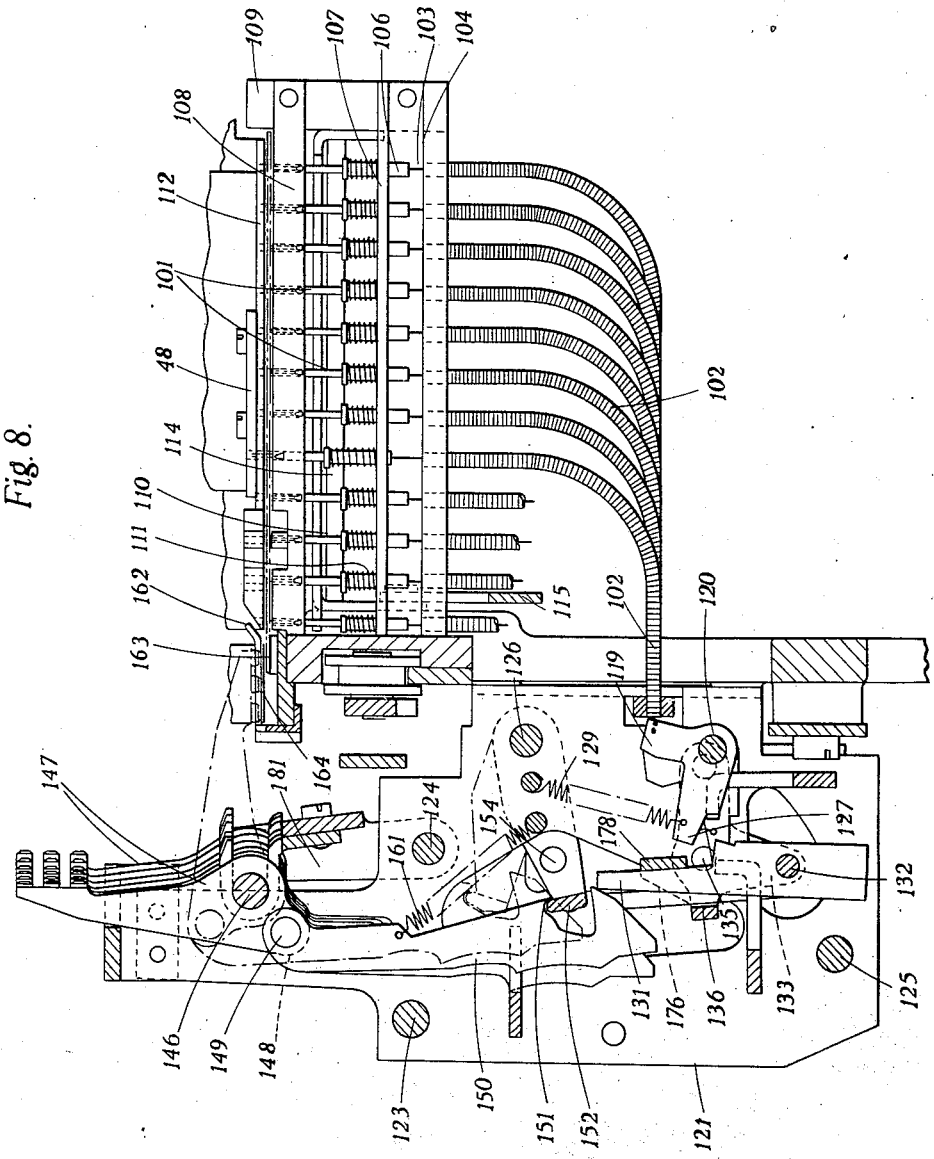
Figure 9:
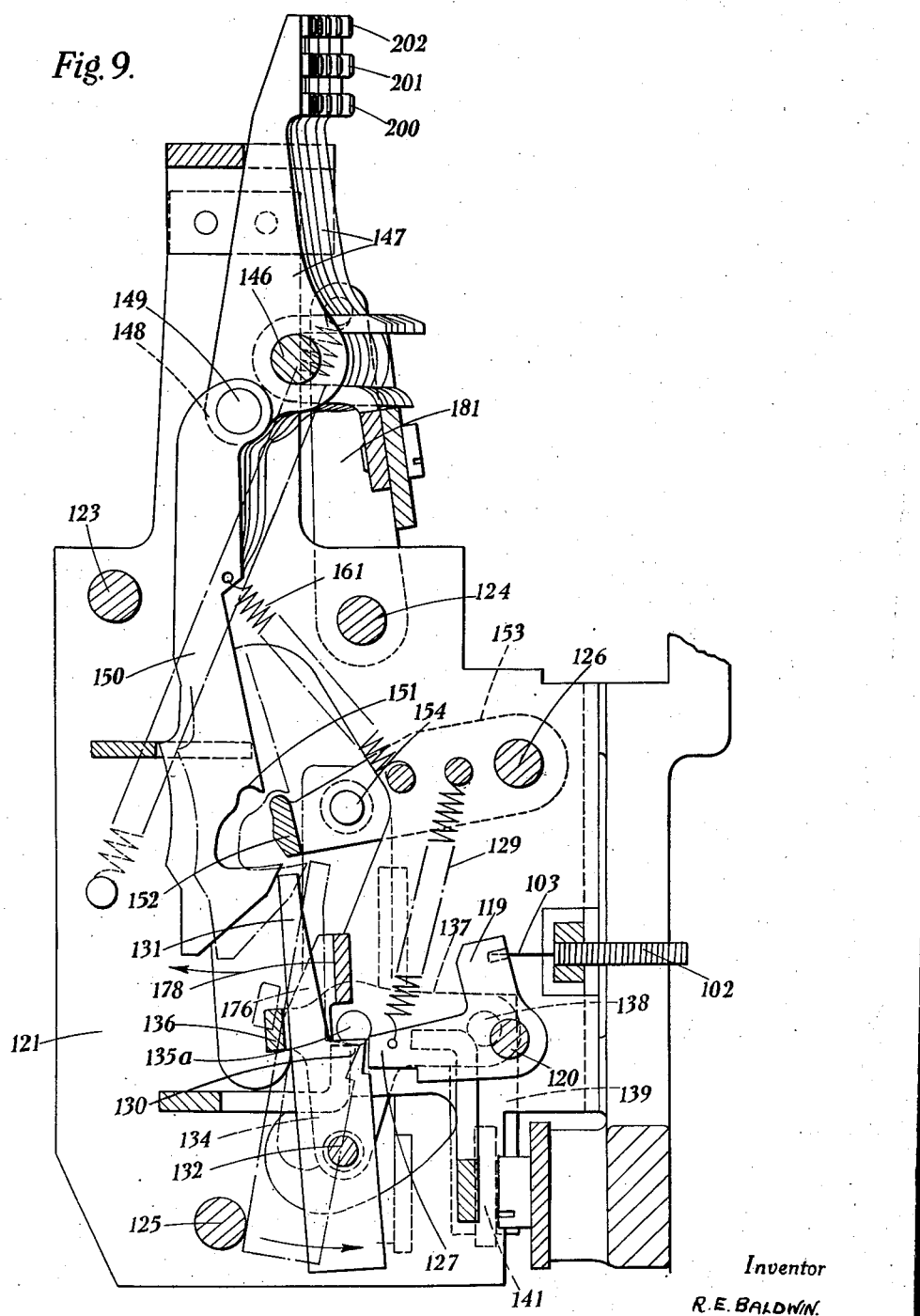
Figure 10:
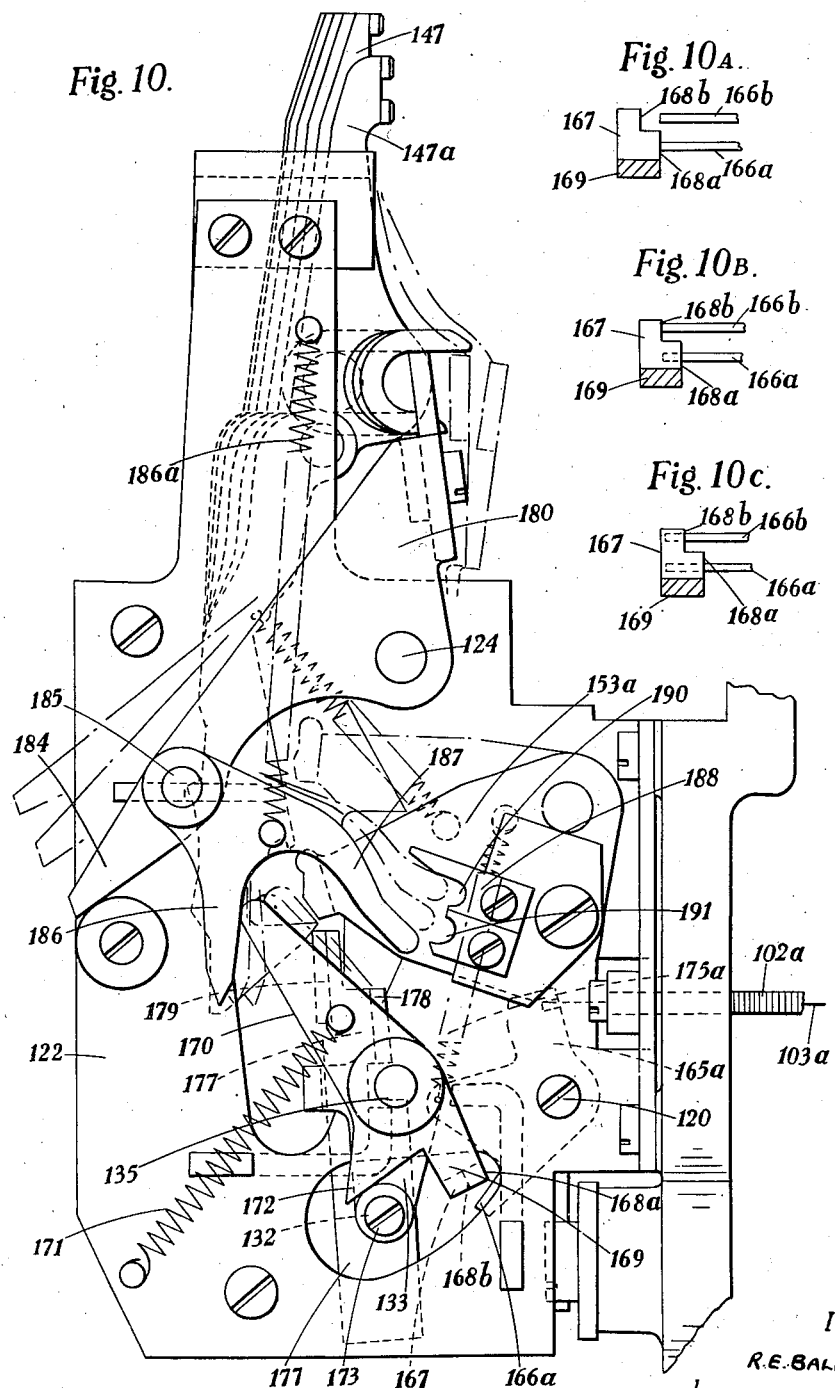
Figure 10A:
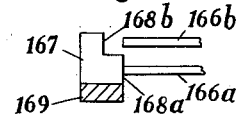
Figure 10B:
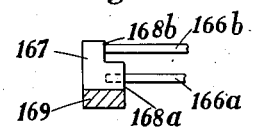
Figure 10C:
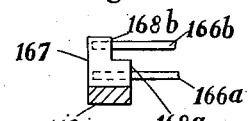
Figure 11:
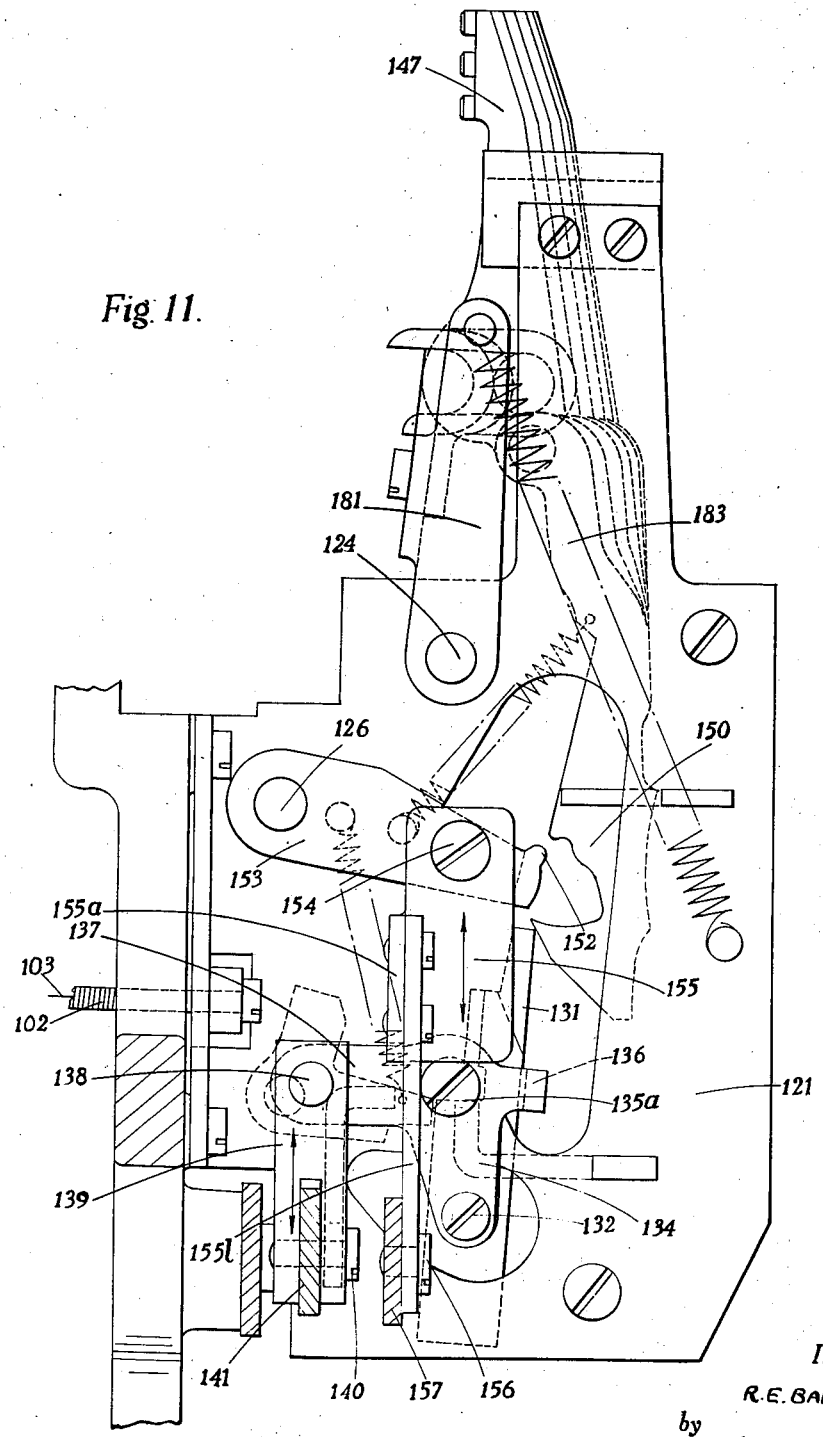
Figure 12:
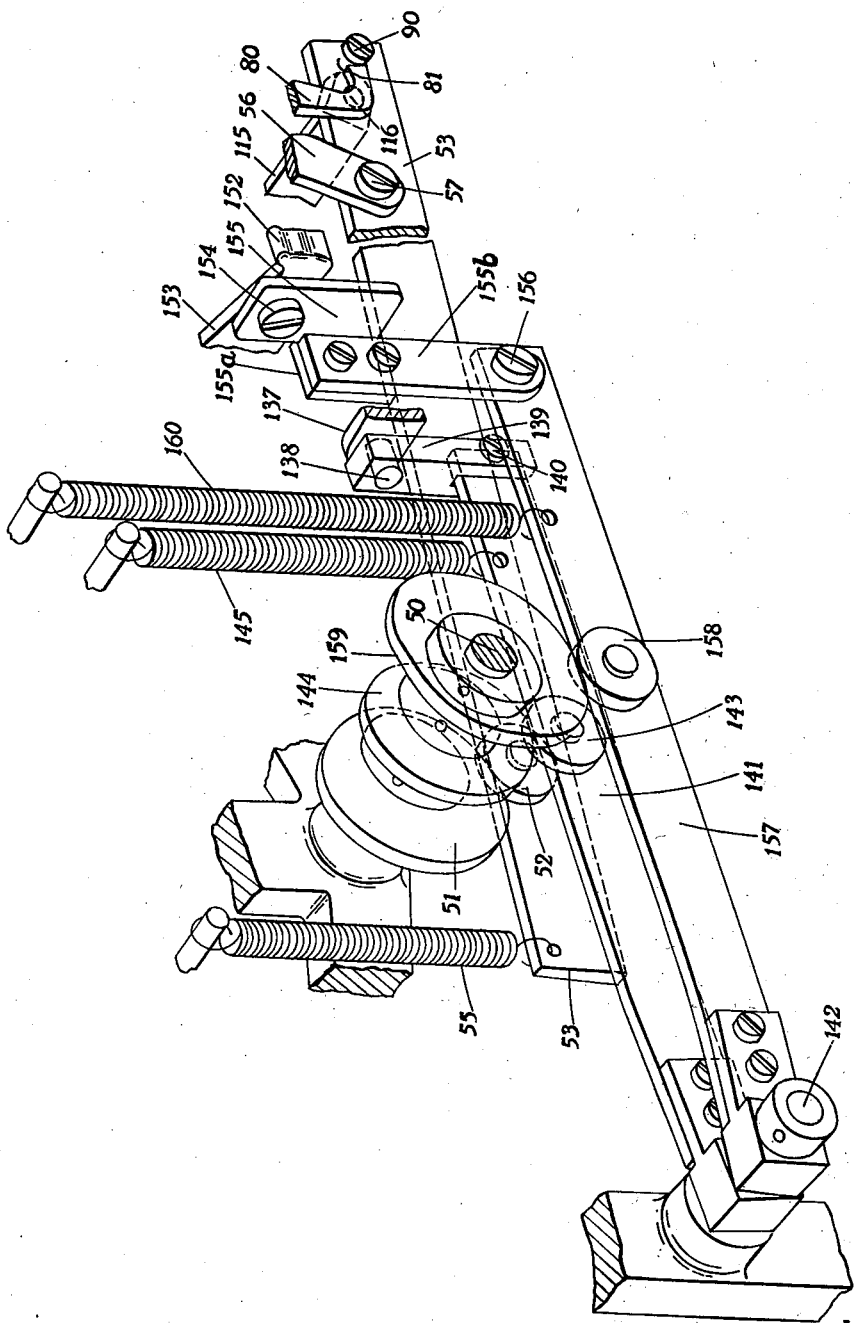

Fig. 7 shows the escapement mechanism in a position in which it is locked out of operation, Fig. 8 is a section through the sensing mechanism and the type lever controlling mechanism, Fig. 9 is a section of the type lever controlling mechanism similar to that shown in Fig. 8, but with the parts in a different position, Fig. 10 is an outside elevation of the type lever controlling mechanism, Figs. 10A, 10B and 10C are diagrams showing the relative positions assumed at different times by certain of the elements which appear in Fig. 10, Fig. 11 is an outside elevation of the type lever controlling mechanism viewed from the side opposite from that seen in Fig. 10, and Fig. 12 is a perspective view of certain levers and their operating cams.

Figure 2:
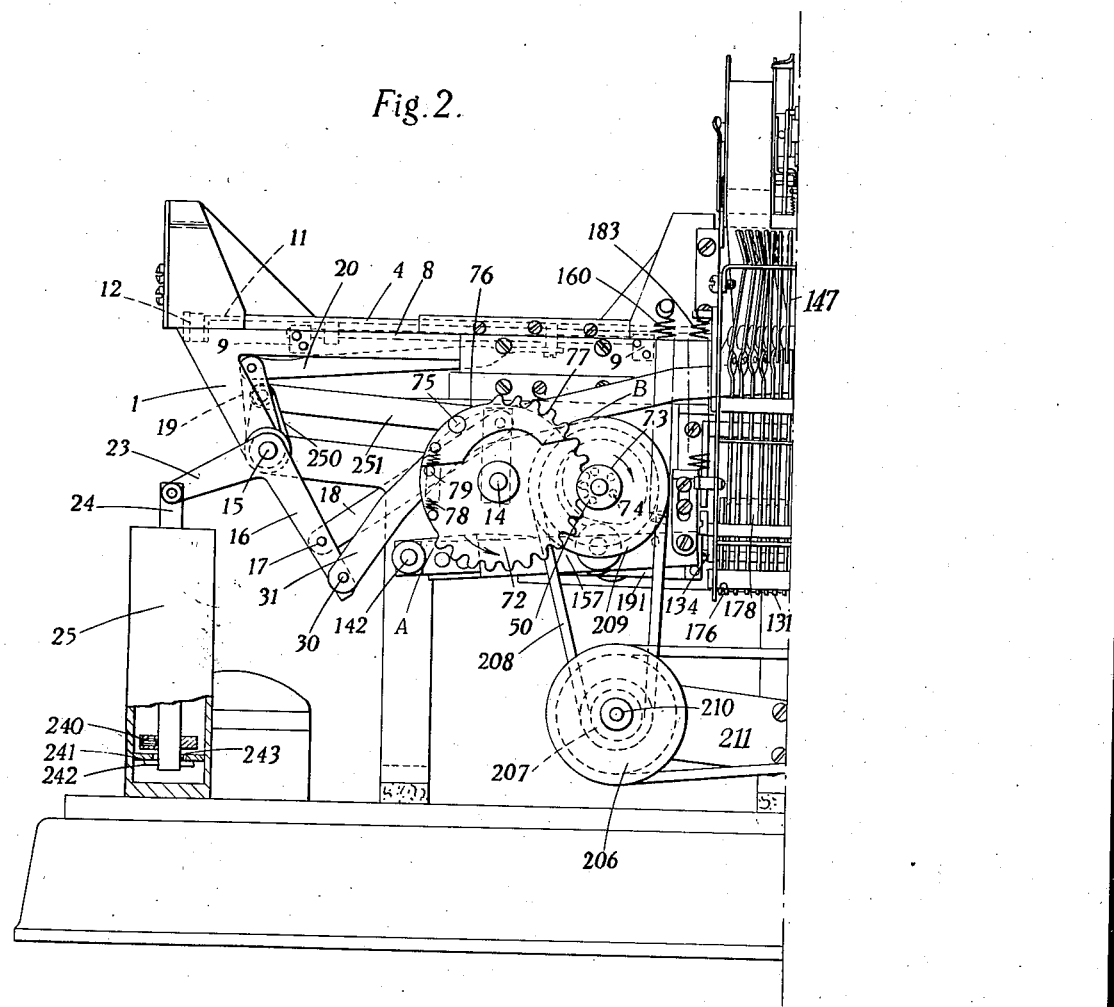

In the construction illustrated in the drawings the machine comprises a frame 1 supported on a base 2 by means of legs 3. Secured to the front side of the frame at its left hand end in Fig. 2 is a plate 4 and projecting from the frame in the same region are two bars 5 to the opposite ends of which is secured another plate 6.

The plates 4 and 6 constitute the side walls of the card magazine, of which the end wall is constituted by a third plate 7.

Passing freely through holes in the bars 5 is a guide rod 8 to which are secured two transverse bars 9. To the bars 9 there is secured by means of screws 10 the card feeding slide 11 carrying the card picker 12.

The slide 11 is reciprocated by the following mechanism from a crank arm 13 secured to a shaft 14. Secured to a shaft 15 freely mounted in the frame 1 is a stirrup member 16 between the arms of which is mounted a rod 17 pivotally connected to the crank 13 by a link 18. Also secured to the shaft 15 is an arm 19 pivotally connected to one of the blocks 9 by a link 20. The manner in which the shaft 14 is driven will be described later. Connected between the rod 17 and a fixed anchorage 20 on the frame of the machine, is a spring 22 and one arm of the stirrup member 16 has an extension 23 pivoted to the plunger rod 24 of a dash pot 25.

Also mounted on the frame 1 is a travelling card carriage having wheels 27 running between rails 28 formed on the machine frame 1.

When the slide 11 and picker 12 are moving from left to right (Fig. 2), the travelling carriage 26 is moving from right to left. When the slide 11 carrying a card reaches its right hand position in Fig. 2, the carriage 26 is in its left-hand position. In this position a pair of grippers 29, 29a on the carriage 26 engage the card and grip it. The carriage 26 then returns step by step to the right and during this movement the slide 11 is under the control of the carriage so that it also returns step by step to the left.

Means for performing these operations will now be described.

The step by step movement of the carriage 26 from left to right takes place under the action of the spring 22 and is controlled by an escapement mechanism which will be described later. The carriage is returned from right to left positively in the following manner.

Pivoted to the base 16 at 30 is a link 31 of which the other end is pivoted at 32 to a pantograph constituted by links 33a, 33b, 33c and 33d. Link 33a is pivoted at 34 to a bearing plate 35 screwed to the fixed frame 1 and link 33d is pivoted to a pin 36 secured to the moving carriage. This pantograph multiplies the movement of pivot 32 by four.

The lower gripper 29a is screwed to the carriage 26 by two screws 37 which also pass through the upper gripper 29 with sufficient clearance to allow the latter to rock.

Pivoted at 38 to the upper end of a lug 39 bent up from the upper gripper 29 is one link 40 of a toggle and pivoted at 41 to a lug 42 bent down from the lower gripper 29a is the other link 43 of the toggle. The two links are also pivoted together at 44. The link 43 has an extension 45 which by bearing against the pivot pin 38 prevents the toggle from moving beyond the straightened position.

Secured to the lower gripper 29a is a vertical lever 46 which passes with clearance through the upper gripper 29 and has a spring 47 tending to keep the gripper closed. When the toggle is in the straight position, however, it holds the grippers open.

Figure 1:
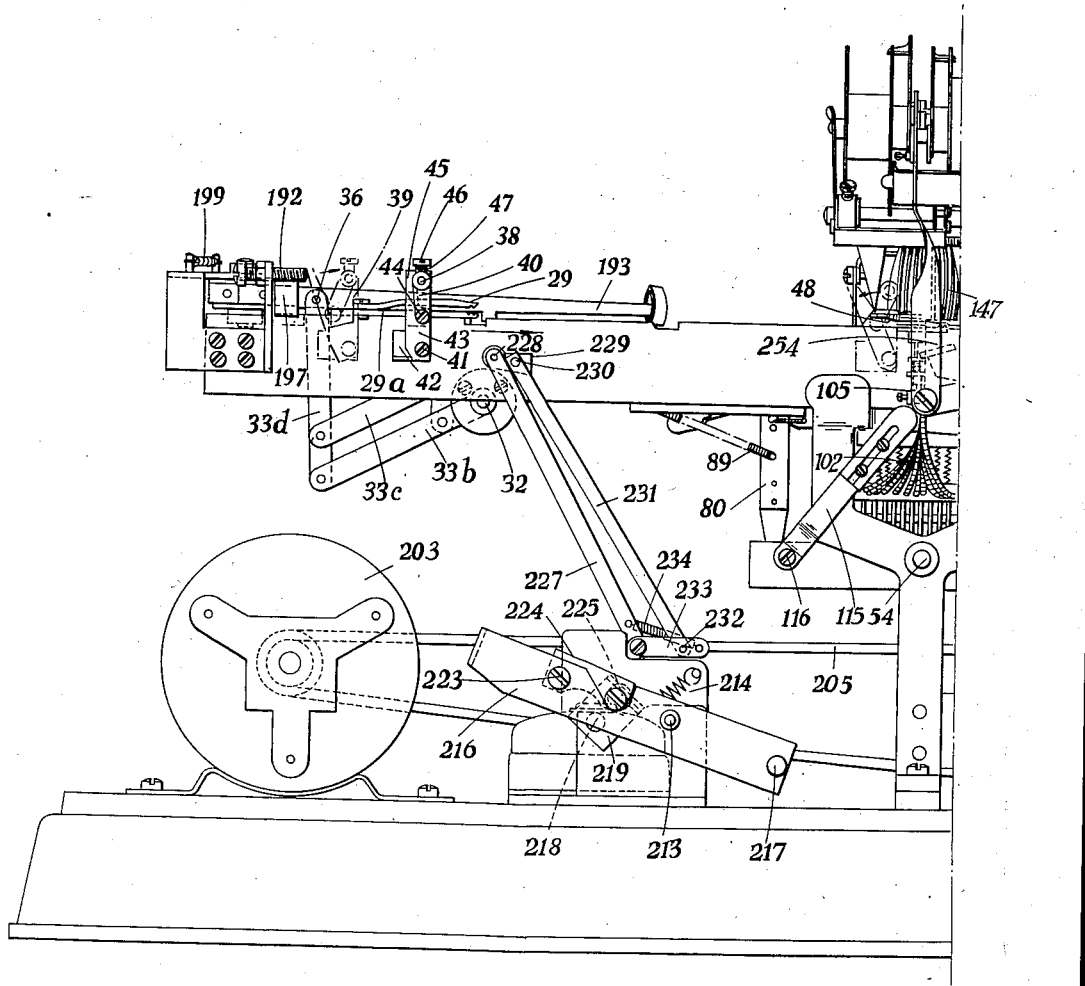
Figure 1A:
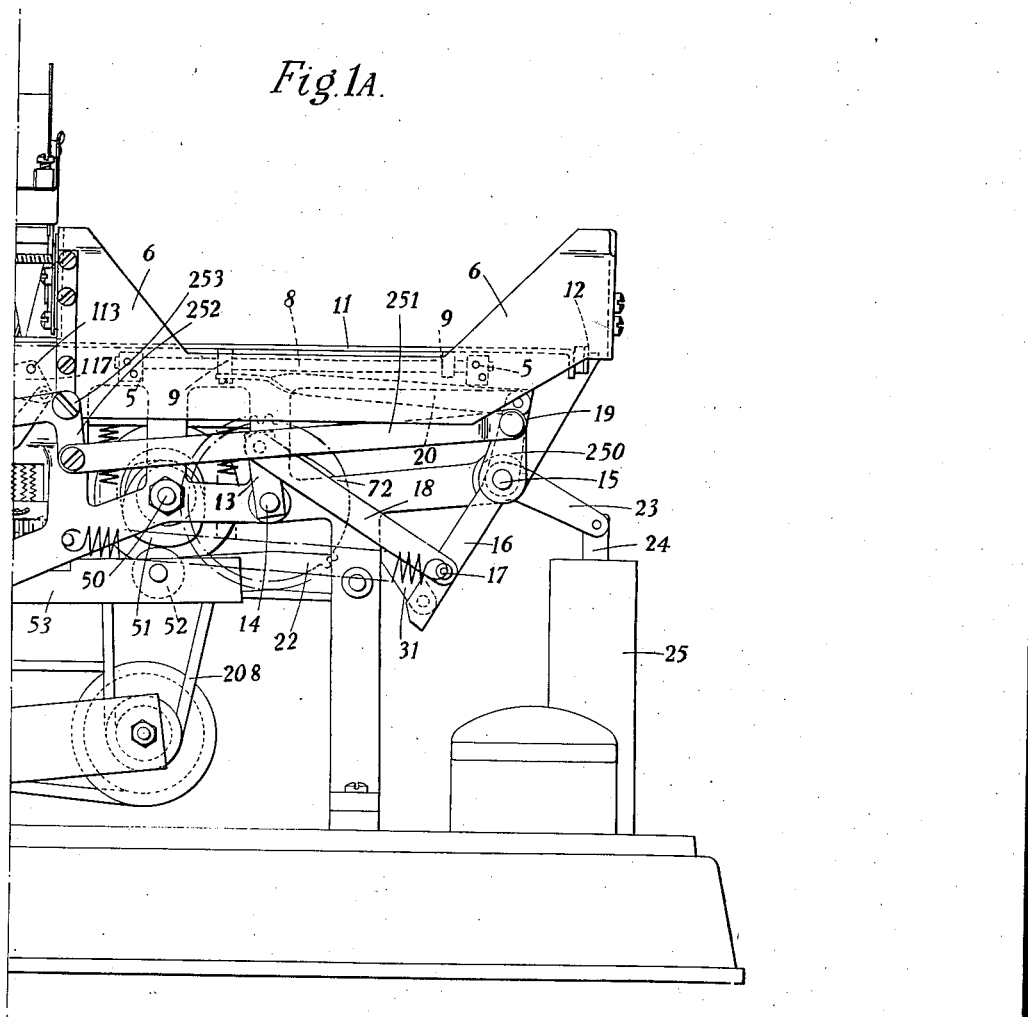

In Fig. 1 the carriage 26 is moving from left to right and on reaching the right hand end of its travel the extension 45 strikes a fixed stop 48 whereby the toggle is broken and the spring 47 closes the grippers 29, 29a on to the card which at this time has been positioned by the slide 11 for engagement by the grippers. The carriage then commences moving step by step from right to left in Fig. 1.

Figure 5:
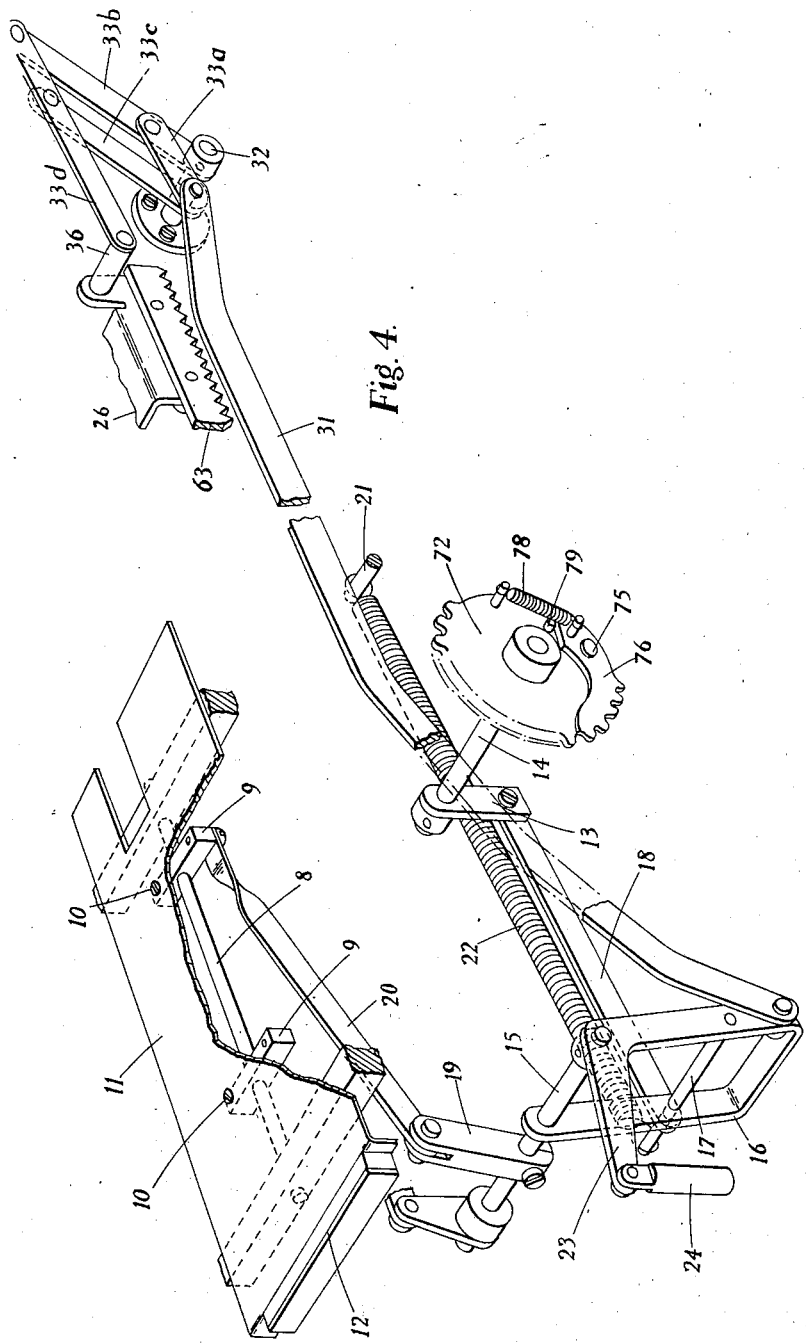
Fig. 5 illustrates the escapement mechanism for the card carriage.
Figure 6:
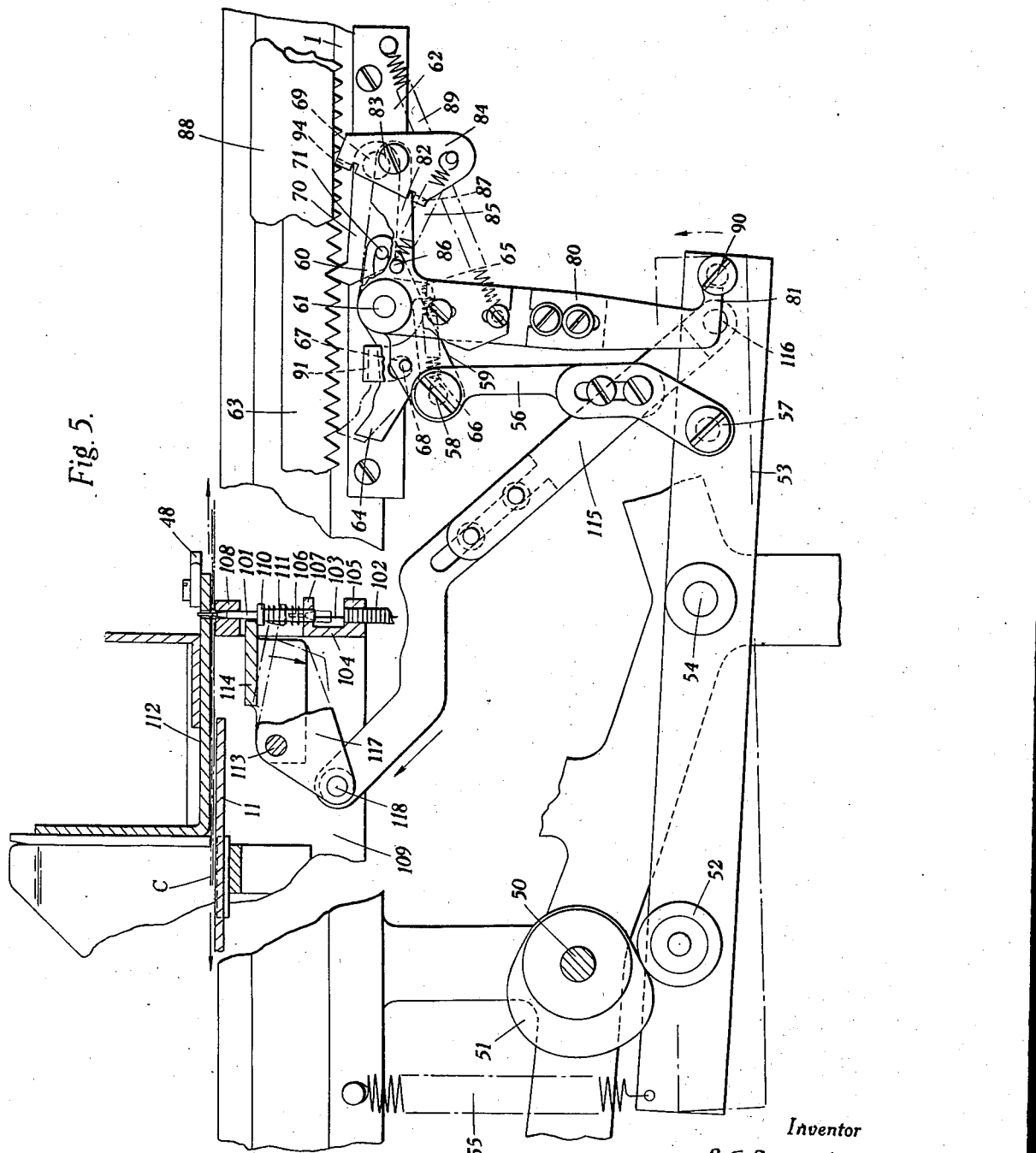
Fig. 6 shows the escapement mechanism in another position.

The step by step movement of the carriage 26 is controlled by an escapement mechanism which is constructed as follows (Figs. 5, 6 and 7).

Secured to a shaft 50 from which the shaft 14 is driven in a manner which will be explained later is a cam 51 co-operating with a roller 52 on a lever 53 pivoted to the machine frame at 54. A spring 55 tends to hold the roller 52 against the cam 51.

Between the pivot 54 and the other end of lever 53 a link 56 is pivoted to the lever at 57 and the upper end of this link is pivoted at 58 to a lever 59, 60 pivoted at 61 to a plate 62 secured to the frame 1 of the machine.

Secured to the carriage 26 is a rack 63 and freely mounted on the pivot 61 is an escapement pawl 64 having a tail 65 to which is attached a spring 66 tending to move the pawl into engagement with the rack 63.

Formed in the pawl 64 is a round hole 67 in which engages a pin 68 on the lever 59, the spring 66 acting to maintain the bottom of the hole against the pin 68.

Pivoted to the plate 62 at 69 is a detent pawl 70 which is also pivoted at 71 to the lever 60.

Thus as the lever 53 is rocked counterclockwise by the cam 51 the link 56 is pushed up and rocks the lever 59, 60 clockwise about pivot 61. Thereby the pawl 64 is moved into engagement with rack 63 and the pawl 70 is withdrawn from engagement with the said rack. When the high part of cam 51 leaves the roller 52 the spring 55 rocks lever 53 clockwise whereby pawl 64 is withdrawn from engagement with rack 63 and pawl 70 is moved into engagement therewith.

During the step by step movement of the carriage 26 from left to right (Figs. 2 and 5) the card feeding mechanism must be held out of operation whereas during the return of the carriage from right to left the escapement pawls 64 and 70 must be held clear of the rack 63.

In order to interrupt the card feed during the step by step movement of the carriage 26 the shaft 14 is driven through an intermittent drive from the shaft 50. Secured to shaft 14 is a gear wheel 72 having its teeth cut away between the points A and B (Fig. 2). Meshing with the teeth of gear wheel 72 are a series of pins 73 projecting from a disc 74 secured to shaft 50.

In Fig. 2 the carriage 26 is travelling from right to left, the escapement pawls 64 and 70 being out of engagement with the rack 63. As shaft 50 rotates, the gear 72 and shaft 14 are rotated counterclockwise and the slide 11 and picker 12 advance the card from left to right to meet the grippers 29, 29a on the carriage 26. As the carriage 26 approaches the left hand end of the travel the grippers 29, 29a close on to the card in the manner already described. The cutaway portion A—B of the gear 72 has not however quite reached the pins 74 and accordingly the bail 16 continues for a short time to move counterclockwise in Fig. 2 thereby pushing the link 31 still further to the right. The carriage 26 is by this time at the extreme left hand end of its travel and cannot move any further. Accordingly the link 31 bends slightly owing to its length and the springiness of the metal of which it is made, thereby affording to the carriage a dwell sufficient to enable the grippers 29, 29a to grip the card.

When the crank 13 is just past its dead centre position in Fig. 2 the cut-away portion A—B of the gear 72 comes into register with the pins 74 and accordingly the drive of the shaft 14 from the shaft 50 is interrupted.

Figure 4:
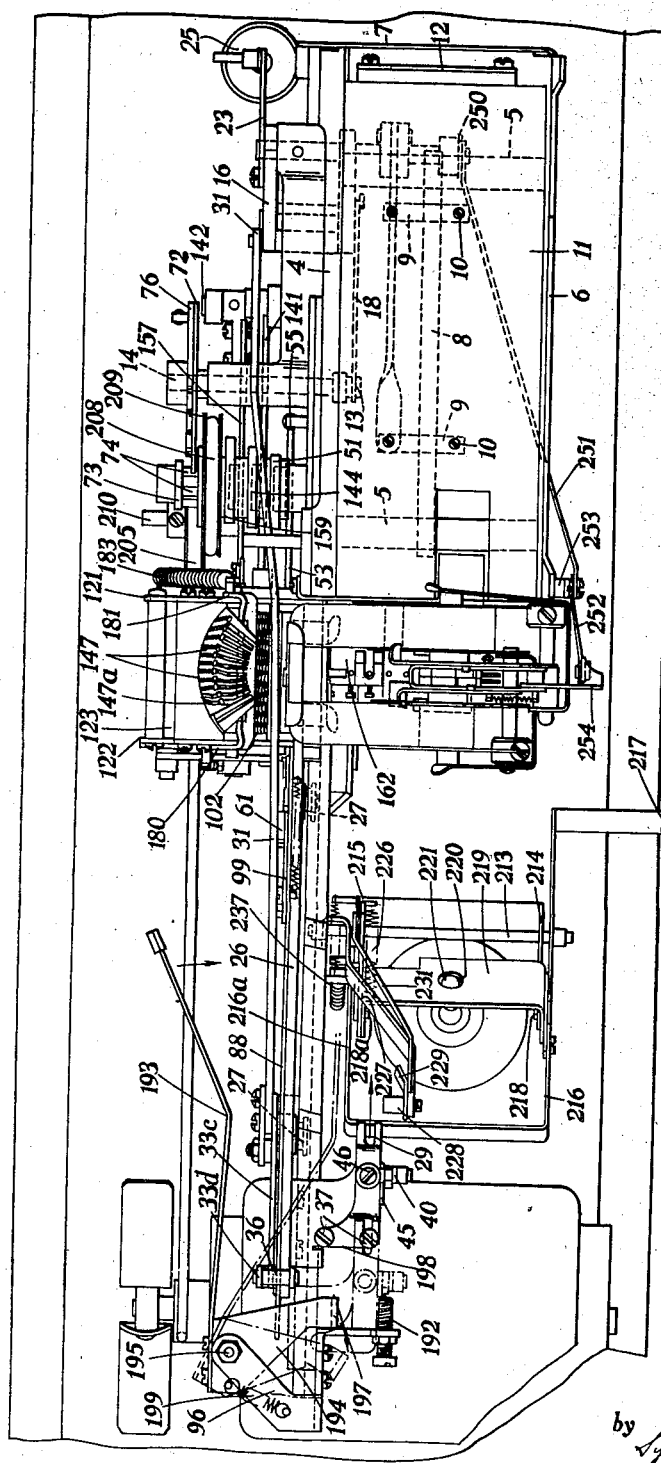
Fig. 4 is a diagrammatic perspective view of the card feed mechanism.

The spring 22 (Figs. 1 and 4) now rocks the bail 16 clockwise in Fig. 2 thereby driving the shaft 14 (still in the counterclockwise direction) and pulling the link 31 to the left (Fig. 2) and the carriage 26 to the right.

During this movement the carriage moves step by step under the control of the escapement pawls 64 and 70 which have now been rendered operative by means of mechanism which will be described later.

The wheel 72 therefore rotates step by step and the slide 11 and card feeding picker 12 are returned step by step to the left in Figure 2.

Pivoted to the wheel 72 at 75 is a plate 76 having teeth 77. This plate is normally held by a spring 78 against a stop 79 in a position in which the teeth 77 form a continuation of the teeth of the gear wheel 72.

The plate 76 is a safety device whereby as the end B of the cut-away portion is approaching the pins 74, the plate 76 will yield if a pin 74 should engage with the top of one of the teeth 77 and eventually permit correct register of the pins 74 with the teeth of the wheel 72.

In order to render the escapement pawls 64 and 70 inoperative during the return of the carriage 26 from right to left the following mechanism is provided.

Freely mounted on the pivot 61 is a depending arm 80 terminating in a hook 81 and having a lateral extension 82 at its upper end. Pivoted to the free end 83 of this extension 82 is a rocker 84 having a spring 85 connected to a pin 86 on the extension 82 and tending to turn the rocker clockwise. This clockwise movement of the rocker is limited by a lug 87 thereon which engages under the extension 82.

Mounted on the carriage 26 is a cam bar 88 (Fig. 7).

When the carriage 26 is at the right hand end of its travel the cam bar 88 is clear of the rocker 84 (Fig. 7 position) and a spring 89 is free to pull the arm 80 counterclockwise so that when the lever 53 is next rocked counterclockwise by the cam 51 the hook 81 engages under a pin 90 on the lever 53 and holds this end of the lever in the raised position so that the cam 51 no longer operates the lever 53.

In this position of lever 53 the link 56 has rocked lever 59, 60 clockwise thereby withdrawing pawl 70 from engagement with the rack 63.

Secured to the arm 80 is a hook 91 overlying the pawl 64 and when the spring 89 rocks the arm 80 counterclockwise the hook 91 pulls the pawl 64 down out of engagement with the rack 63, the hole 67 in the pawl permitting this movement. This position of the parts is shown in Fig. 7.

When the pawls 64 and 70 are thus disengaged the spring 22 pulls the carriage 26 still further to the right until the teeth of wheel 72 re-engage the pins 74. The latter then drive the wheel 72, and the carriage 26 moves slightly further to the right until the dead centre position of crank 13 is reached. During these movements of the carriage to the right the grippers 29, 29a are opened to release the card in the manner already explained, and the card is ejected by mechanism which will be described later.

The carriage 26 is then returned to the left in Fig. 2 by the positive drive of the pins 74 and gear wheel 72. After the carriage has moved a short distance to the left the end 92 of the cam bar 88 strikes the rocker 84 and swings it counterclockwise about its pivot (Fig. 2 position) the bar 88 thereafter sliding over the rocker.

At the other end of the cam bar 88 is a cam surface 93 and towards the end of the leftward movement of the carriage this end of the bar 88 passes beyond the rocker which thereupon assumes the position of Fig. 7.

After the carriage has travelled a short distance back to the right, and before the cut-away part of the gear 72 has come into register with the pins 74 the cam surface 93 engages a lug 94 on the rocker and pushes it bodily downwards (Fig. 6 position) thereby rocking the arm 80 clockwise and releasing the lever 53 and also the pawls 64 and 70 so that the escapement mechanism is operative again.

During the movement of the carriage to the right the rocker remains in this depressed position, until the end 92 of the cam bar 88 passes beyond it whereupon the spring 89 rocks the arm 80 counterclockwise to the Fig. 7 position.

The cam bar 88 is made removable so that it can be replaced by a bar of different form to permit certain fields of the card to be skipped if desired. In order to effect skipping the cam bar would have one or more portions cut out of its under edge to a depth equal to that of the cam surface 93 and of a length corresponding to the number of columns to be skipped.

In order to permit removal of the bar 88 it is slotted at 95 to engage pins 96 on the carriage 26 and a latch 97 is pivoted to the carriage at 98. This latch has a spring 99 whereby it is normally maintained in engagement with a recess 100 in the cam bar 88. To remove the bar 88 the latch 97 is lifted clear of the recess 100 by hand and the bar 88 is slid to the right (Fig. 7).

When the carriage 26 travels step by step from left to right in Fig. 2 it advances the card over a column of sensing pins 101 which sense the card column by column. There are twelve sensing pins 101 disposed in a column beneath the path of the card and each pin constitutes in effect the head of a Bowden cable of which the casing is indicated at 102 in Fig. 8 and the inner wire at 103.

The mounting of the sensing pins is as follows.

Projecting from the machine frame 1 is a channel shaped bar 104 (Figs. 5 and 8) in the lower rib 105 of which the upper ends of the casings 102 of the Bowden cables are secured.

Each sensing pin 101 has an enlarged lower portion 106 which passes freely through the upper rib 107 of the bar 104. The upper ends of the sensing pins are guided in a bar 108 projecting from the machine frame and connected at its right hand end (Fig. 8) to the corresponding end of the channel member 104 by a bar casting.

Each pin 101 has a collar 110 and between the collar 110 and the rib 107 is a spring 111 tending to raise the sensing pin. Above the pins is a pin plate 112 having twelve holes, one for each pin.

The card C is delivered by the slide 11 between the bar 108 and plate 112 to the grippers 29, 29a in the carriage 26 which positions the card with the first column over the sensing pins 101.

Pivoted at one end to the frame 1 and at the other end (at 113) to the casting 109 is a bail 114 which overlies the collars 110 on all the pins 101. This bail 114 is depressed at each revolution of the shaft 50 while the carriage 26 is moving under the control of the escapement. The depression of the bail pushes all the sensing pins 101 down clear of the card C and the carriage 26 then advances the card to bring the next column over the pins.

To this end the bail 114 is rocked by the lever 53 which operates the escapement mechanism, being connected to this lever by a link 115, pivoted to lever 53 at 116 and to an arm 117 of the bail at 118. Thus during the return of the carriage 26 from right to left in Fig. 2 when the lever 53 is held by the hook member 80, 81, the bail 114 is held down so that the pins 101 are also held down out of the path of the card.

Ten of the sensing pins 101 represent the digits 0 to 9 and the other two pins 101a and 101b represent the letters A and B respectively. In order to produce the remaining letters of the alphabet code punching is employed, the A hole together with one or other of the holes representing 0 to 9 serving to represent one or other of the letters C to N, while the B hole together with one of the holes representing 0 to 9 is used to represent the letters P to Z.

It may here be mentioned that in the particular arrangement now being described the letter S is represented by the numeral 8 and the numeral 6 serves also to represent the letter G.

The mechanism controlled by the A and B sensing pins 101a and 101b therefore differs from that controlled by the pins 101 representing the digits 0 to 9 and in order to facilitate understanding of the invention, the latter mechanism will now be described (Figs. 8 to 11).

As already explained each sensing pin constitutes in effect the head of a Bowden cable. In the case of the sensing pins 101 representing the values 0 to 9 the other end of each Bowden cable bears against one arm 119 of a bell crank pivoted on a rod 120 fixed between the side plates 121, 122 of a frame secured to the main frame of the machine. The plates 121 and 122 are also connected together by four rods 123, 124, 125 and 126.

Each bell crank also has a horizontal arm 127 and a spring 128 attached to each arm 127 tends to rock the associated bell crank clockwise in Figs. 8 and 9.

When the bail 114 moves down and withdraws all the pins 101 from the card, all the bell cranks 119, 127 are rocked counterclockwise into a position in which the free end of each arm 127 comes into register with a nose 130 on a corresponding type bar disabling lever 131. These disabling levers 131 are all freely pivoted on a rod 132 carried between two depending arms 133, 134 pivoted by means of trunnions 135, 135a between the plates 121, 122 and connected by a bar 136 to form a frame which is rockable about the rod 135.

The arm 133 is formed integral with a horizontal arm 137 pivoted at 138 to a link 139 of which the lower forked end is pivoted at 140 to a lever 141 (Fig. 12) which is pivoted at its other end on a stub shaft 142 fixed to the machine frame. The lever 141 carries a roller 143 which is maintained by a spring 145 in contact with a cam 144 secured to the shaft 50.

When a card is in sensing position and the bail 114 rises, then any pin 101 which finds a hole in the column concerned will rise to its fullest extent and permit the associated bell crank 119, 127 to rock clockwise under the action of its spring 128, thereby bringing its arm 127 above the nose 130 on the corresponding type bar disabling lever 131. Those pins 101 which find no hole are prevented from rising by engagement with the under surface of the card and therefore stand in the path of the noses 130 on their corresponding type bar disabling levers 131.

Mounted on a rod 146 in the upper part of the frame 121, 122, is a series of eleven type levers 147, 147a of which the first bears the letters A and B only, the second bears the characters O, C and P, the third bears the characters 1, D and Q, the fourth bears the characters 2, E and R and so on. The A and B lever is indicated at 147a in the drawings and the other type levers at 147. The rod 146 on which these type levers are pivoted is of arcuate form, the radius being such that each type lever prints at the same position on the card, this position being on the edge of the card immediately at the head of the column containing the hole or holes which controlled the actuation of the type lever.

Each type lever 147, 147a is provided with a tail 148 from which is suspended by a pivot 149 an actuating hook 150 of which the hook portion 151 is in register with an operating bail 152 carried by two arms freely mounted on the rod 126. Pivoted to one of the arms 153 at 154 is a plate 155 having a lug 155a bent off at right angles to it (Figs. 11 and 12) and screwed to this lug is a link 155b pivoted at 156 to a lever 157 pivoted at its other end to the stub shaft 142. Lever 157 carries a roller 158 held in engagement with a cam 159, secured to shaft 50, by means of a spring 160. At each step movement of the card carriage 26 the arms 153 are rocked by the cam 159 and if any hook member 150 is engaged with the bail 152, said hook member will be lifted and will cause the corresponding type member 147 or 147a to swing down into engagement with the card and make an impression thereon.

All the hook members 150 are urged by springs 161 into engagement with the actuating bail 152 and with each hook member is associated a disabling lever 131 referred to above. As already explained, when a column is sensed, all the pins 101 which do not find a hole in the column are prevented from rising and therefore the horizontal portions 127 of the corresponding bell cranks remain in engagement with the corresponding disabling levers 131. The frame 133, 134, 136 carrying the disabling levers 131 is then rocked counterclockwise in Fig. 9 and by reason of the engagement of the noses 130 on the disabling levers corresponding to the sensing pins which have not found a hole with their corresponding bell cranks 127 the said disabling levers 131 are tilted counterclockwise about their pivot rod 132 so that they swing the associated hook members 150 clear of the actuating bail 152. Consequently only that hook member 150 corresponding to that sensing pin 101 which has found a hole in a card engages with the actuating bail 152 to produce operation of the corresponding type lever 147; for example, if there is a hole representing the digit 3 in a column, then only the hook member associated with the type lever carrying the digit 3 will engage with the actuating bail.

As soon as the actuating bail 152 has begun to lift, the disabling levers 131 are free to return under the action of the frame 133, 134 carrying them. This brings them out of contact with the hook members 150 and also the bell cranks 127, enabling the sensing pins 101 to return clear of the card while the type lever which is to print descends. Should two holes have been punched in error, two type levers will descend, so that they will push each other clear of the slot in a plate 162 (Fig. 8) which normally aligns the type. Thus neither will print, the blank drawing attention to the error in punching.

The foregoing explains how the digits 0 to 9 are printed. The means for controlling the printing of the alphabetical characters will now be explained.

As already mentioned, each of the type levers 147 except the first 147a, which carries only the letters A and B, bears three characters, a numeral and two letters. The arcuate rod 146 on which the type levers are pivoted is normally so disposed that the uppermost of the three characters carried by any type lever will strike the card at the desired printing position, this being, as already stated, at the head of the column containing the hole which controlled the type lever in question. In this connection it may be explained that the type levers are normally in a vertical position and swing down on to the card into a horizontal position.

In order to cause the middle character on any type lever to print, the arcuate rod 146 on which the type levers are pivoted is shifted horizontally to the right in Fig. 9 to a predetermined extent after the manner of the case shift in a typewriter. Likewise, in order to cause the lowermost character to print, the arcuate pivot rod 146 is moved horizontally to the right to a still greater extent.

In order to control this case shift operation the A and B hole positions on the card are employed. When the A hole is sensed, the pivot rod 146 for the type levers is shifted to its first position so that if the column contains a second hole, for example in the 4 position, the middle character on the 4 type lever will strike the card at the desired position, this character being in the present example the letter H. If the column contains the A hole alone, then the A and B type lever 147a will be actuated and the case shift will also operate to bring the character A into printing position, the letter A being in the middle position on the A and B type lever.

If a hole in the B position occurs then the pivot rod 146 for the type levers will move into its second position so that if for example a hole in the 4 position is also present in the column, the lowermost character on the 4 type lever, namely the letter U will print.

The pivot rod 146 for the type levers is so disposed in relation to the card that when no type lever is in contact with the card, the pivot rod is located away from the card and does not overlie it. Since printing is effected at the head of a column, when case shifting occurs, so that, for example the middle character on a type lever makes an impression at the head of a column, the upper character will tend to print at a position further towards the centre of the card. The lower character will not tend to print since it will be clear of the edge of the card. On the other hand, if a B hole is sensed and the pivot rod 146 for the type levers moves to its second position, then all three characters will overhang the card and all will tend to print simultaneously.

Means is therefore provided according to the invention, for ensuring that when a middle or lower character is printing, only that character which is in register with the edge of the card at the head of the column is permitted to print. To this end, at the printing position there is provided below the card a slightly raised fixed element or platen 163 (Fig. 8), this platen having a flat surface just sufficient to support the portion of the card on which printing is to be effected, this surface being connected by a ramp to the portion of the machine over which the card advances step by step. As the card passes over this platen member, the portion of the card immediately over the platen is slightly curved or bulged up in relation to the rest of the card and this bulging of the card is sufficient to prevent the overhanging character or characters on the operative type lever from actually making contact with the card and effecting an impression thereon.

The ink ribbon 164 is arranged to overhang the edge of the card to an extent only equal to the pitch of the type so that the overhanging type do not bring the ribbon into contact with the card.

In order to control the case shift, the following mechanism is provided:

For each of the A and B sensing pins 101a, 101b a bell crank 165a, 165b respectively is provided pivoted on the same shaft 120 as the other bell cranks 119—127 and having one vertical arm in engagement with a corresponding Bowden cable 102a, 102b connected to the corresponding sensing pin 101a, 101b. The other arm 166a, 166b of each of these bell cranks is not horizontal but is inclined downwardly (Fig. 10). Disposed adjacent the lower ends of these inclined arms of the two bell cranks is a lug 167 having two steps 168a, 168b formed thereon, this lug being bent off from a lever 169 which is pivoted at the same point 135 as the rockable frame 133, 134 carrying the rod 132 on which the type lever disabling members 131 are pivoted. This lever 169 has an upwardly directed extension 170 and is urged by a spring 171 in a direction such that the stepped lug 167 is urged towards the lower ends of the inclined arms 166a, 166b of the A and B bell cranks.

The pivoted lever 169, 170 is formed with a projection 172 held by a spring 173 in contact with the head of a screw 173 serving to secure one end of the shaft 132 to the arm 134. When the arms 133, 134 carrying the pivot rod 132 for the disabling members 131 are in their normal position (over to the left in Fig. 9) the lever 169 is in what may be called the A position, and when the arms 133, 134 carrying the said pivot rod move, the movement is such that if unobstructed, the lever 169 can move into what may be called the numerical position.

If the card column which is being sensed does not contain an A or a B hole then the A and B pins 101a, 101b will both be held down and the cables 102a, 102b will prevent both bell cranks 165a, 165b from moving out of the position shown in Fig. 10 in which their arms 166a, 166b are below the level of the stepped lug 167. Consequently the lever 169—170 will be free to move counterclockwise from the A position to the numerical position in which position it is shown in Fig. 10.

Fig. 10A is a diagrammatic plan of the lug 167 and the arms 166a, 166b in this position.

If the A hole is sensed, the bell crank 165a will be allowed to rock clockwise under the action of its spring 175a to a position in which its arm 166a stands in the path of the step 168a and prevents the lever 169—170 from moving out of the A position (Fig. 10B).

If the B hole is sensed the bell crank 165b is rocked clockwise and its arm 166b moves to a position in which it stands in the path of the step 168b whereby the lever 169—170 is free to move into the B position (Fig. 10C).

Pivoted on the rod 132 are two arms 176, 177 connected by a cross bar 178.

When any of the numerical sensing pins 101 passes through a hole in a card the corresponding bell crank 119, 127 is rocked clockwise from the position of Fig. 9 to the position of Fig. 8. In this latter position the arm 127 of the bell crank stands in the path of the cross bar 178. When the frame 133, 134 is rocked counterclockwise from the Fig. 8 position the cross bar 178 engages the arm 127 of the bell crank corresponding to the sensing pin 101 which has found a hole and is thereby obstructed. Consequently the arm 177 rocks counterclockwise about its pivot 132 and a lug 179 on its upper end pushes the hook member 150a for the A—B type lever 147a clear of the actuating bail 152 whereby the A—B type lever is disabled (see Fig. 10).

If there is no hole in any of the numerical positions 0 to 9, then none of the bell crank arms 127 will stand in the path of the cross bar 178 so that the arm 177 will be free to rock with the frame 133, 134 and the hook member 150a for the A—B type lever will remain in engagement with the actuating bail 152 and this A—B type lever will operate.

The question as to whether the A or B type shall print is determined by the position of the A and B bell crank arms 166a, 166b. If the A hole alone occurs, then the A bell crank 165a alone is rocked and the free end of its arm 166a obstructs the step 168a in the lug 167 so that the lever 169, 170 remains in the A position. If the B hole alone is sensed then the arm 166b of the B bell crank 165b moves into register with the step 168b so that the lever 169, 170 assumes the B position.

Reference has already been made to the fact that when the A hole is sensed and the lever 169, 170 accordingly occupies the A position, the pivot rod 146 for the type levers 147 is moved forward to a first position which may be referred to as the A position whereas when the B hole is sensed and the lever 169, 170 accordingly moves to the B position, the pivot rod for the type levers is moved still further forward into what may be called the B position.

In order to effect this operation, the pivot rod 146 for the type levers 147 is carried at the upper ends of two arms 180, 181 pivoted on the fixed rod 124, a strong spring 183 being attached to one of these arms 181 in order to hold them in the normal or numerical position. Secured to the arm 180 is an extension 184 inclined downwardly to which there is pivoted at 185 a bell crank 186, 187 having one arm 186 depending substantially vertically and maintained by a spring 186a in contact with the lever 170. When the lever 170 is in the numerical position, this bell crank 186, 187 is maintained with its other arm 187 clear of a notched plate 189 secured to the arm 153a of the actuating bail 152 for the type levers so that when this bail rises, to operate one or other of the type levers, the bell crank 186, 187 is unaffected.

The notched plate 188 has an upper and a lower notch, the upper notch 190 being conveniently referred to as the A notch, while the lower notch 191 may be referred to as the B notch. If the lever 170 moves to the B position, the bell crank 186, 187, will swing counterclockwise until the free end of its arm 187 engages with the B notch 191 in the notched plate 188. Consequently, this arm 187 of the bell crank, together with the arm 153a of the type lever actuating bail 152 form what is in nature a toggle and the rise of the actuating bail straightens this toggle and since the bell crank 186, 187 is pivoted at 185 to the lower end of the downwardly inclined extension 184 of the arm 180 carrying the type lever pivot rod 146, this downward extension 184 is rocked about its pivot 124 and takes with it the two arms 180, 181 carrying the type lever pivot rod 146 so that the type levers 147, 147a are moved bodily towards the card to a predetermined extent.

If the lever 170 occupies the A position, the bell crank 186, 187 associated therewith will move to a greater extent and its free end 187 will engage the A notch 190. The same action as before then occurs when the actuating bail 152 rises but the extent of movement of the type levers 147 towards the card is not so great. In the first case the type levers are moved to an extent such that if any one of them is operated the lowermost type 200 will print (Fig. 9), whilst in the second case, the extent of movement is such that the middle type element 201 will print. If the rod 146 does not move at all the uppermost type element 202 will operate.

This movement of the type levers 147, 147a bodily towards the card by reason of the bodily shifting of their pivot rod 146 occurs simultaneously or contemporaneously with the lift of the actuating bail 152 so that any type lever of which the actuating hook 150 is in engagement with the actuating bail, will swing about its pivot 146 during the time in which the said pivot 146 is being moved bodily towards the card. The case shifting motion therefore occurs contemporaneously with the actuation of the type lever so that by the time that the type lever has swung down about its pivot 146 on to the card, the case shifting movement is completed.

It has already been explained that when the middle type element 201 or the lowermost type element 200 prints, the upper type element 202 or both the upper and middle type elements 201, 202 as the case may be, overhang the card. Since the printing takes place at the head of a column, and there may be a hole in the first position from the edge of the card, the overhanging portion of the type element would overlie this hole. Consequently, according to the invention, means is provided for withdrawing the sensing pins 101, 101a, 101b, before the type elements actually strike the card in order to prevent the top of a sensing pin from being struck by the descending type element. To this end, the bail 114 already referred to which withdraws the sensing pins, is timed to operate so that the pins are clear of the card just before the type elements strike the latter.

Each column of the card is sensed and the interpretation thereof is printed at the head of the column in the manner described above as the card carriage 26 moves step by step from right to left in Fig. 1.

As the carriage 26 approaches the left hand end of its travel in Fig. 1 the extension 45 of the toggle link 43 engages a fixed stop 192 adjustably attached to the frame 1 and the toggle 40, 43, straightens thereby opening the grippers 29, 29a and releasing the card which has been sensed.

Figure 3:
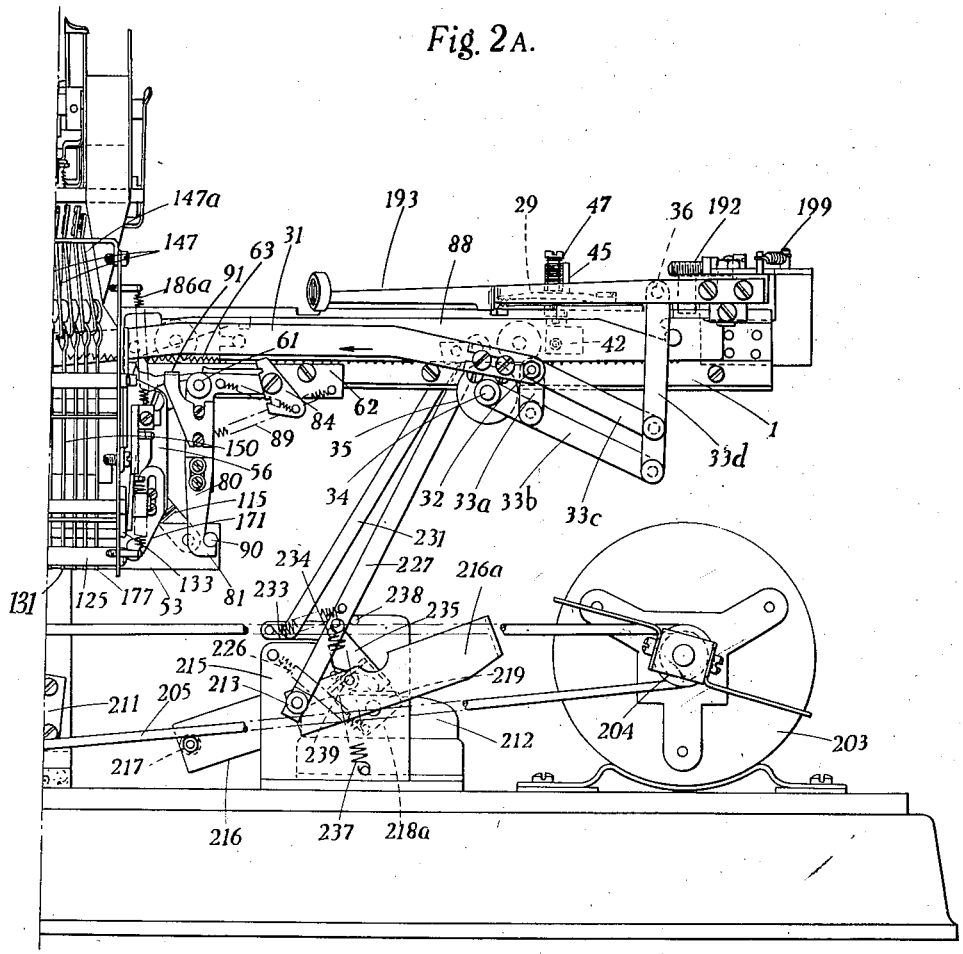
Fig. 3 is a plan.

The card is then ejected by an ejector arm 193 which is screwed to an operating arm 194 pivoted at 195 to a bracket 196 secured to the frame 1. The arm 194 has a lug 197 which stands in the path of the left hand edge 198 of the grippers 29, 29a (Fig. 3). After the grippers have opened to release the card the carriage 26 jumps to the left (Fig. 3) and the edge 198, by engagement with the arm 194 rocks the ejector arm clockwise thereby sweeping the card out laterally into a receiver (not shown). A spring 199 returns the ejector arm 193 to the position of Fig. 3 after the carriage 26 has returned a short distance to the right in Fig. 3.

The shaft 50 is driven from a motor 203 by belts and pulleys 204, 205, 206, 207, 208 and 209, the shaft 210 for the pulleys 206 and 207 being mounted on a bracket 211 secured to the machine frame. The supply of current to the motor 203 is controlled by a tumbler switch 212 which is operated as follows.

Pivoted on a rod 213 mounted in two plates 214, 215 secured to the base of the machine is a stirrup member 216, 216a and projecting from the arm 216 of the stirrup member is an operating handle 217. Pivoted to the plates 214, 215 at 218, 218a is another stirrup member 219 having a hole 220 through which projects the operating knob 221 of the switch. Pivoted to the stirrup arm 216 at 223 is a link 224 which is pivoted to one arm of the stirrup 219 at 225.

In the drawings the switch is shown in the closed position, and a spring 226 is provided which tends to rock the bail clockwise in Fig. 2 (counterclockwise in Fig. 1). The link 224 however holds the switch in the open position until the stirrup 216 is rocked counterclockwise in Fig. 1 to a predetermined extent by means of the handle 217 after which the spring 226 snaps the switch into the open position.

Associated with the switch 212 is a mechanism for opening the switch to stop the motor when the machine runs out of cards.

Pivoted in the rod 213 is a link 227 carrying at its upper end a pin 228. Pivoted to the pin 228 is a short lever 229 to which is pivoted at 230 a link 231 of which the lower end is pivoted at 232 to one arm 233 of a lever pivoted to the link 227 at 234. The other arm 235 of the lever 233—235 extends downwardly and terminates in a hook 236.

A spring 237 is attached to the link 227 and urges it clockwise in Fig. 2, a stop pin 238 being provided to limit this movement.

The pin 228 stands in the path of the lug 42 depending from the lower gripper 29a and as the carriage 26 moves to the right in Figs. 1 and 3 the lug 42 engages the pin 228 and rocks the link 227 clockwise about the pivot 213.

The plunger rod 24 of the dashpot 25 carries a collar 240 near its lower end and resting on a taper pin 241 passing through the rod 24 is a washer 242 of which the internal diameter is larger than that of the rod so that an annular space 243 is left.

When the carriage 26 returns to the right in Fig. 2 the rod 24 rises and the oil within the dashpot 25 keeps the washer 241 down against the pin 242 so that the oil can flow under the collar 240 and through the annular space 243 thereby permitting a relatively rapid movement of the carriage 26.

The ribbon feed mechanism which is of usual form includes the usual feed pawl which is operated from a lever 250 secured to the shaft 15 through a link 251 pivoted to one arm of a bell crank 252 pivoted to the frame at 253 and of which the other arm is connected to the feed pawl by a link 254.

Since the sensing pins are connected to the type lever control mechanism by means of Bowden cables the type levers may be disposed in any desired position relative to the sensing pins and accordingly the invention is not limited to constructions in which the type elements print upon the record which controls them.

I claim:

A record card controlled typewriting mechanism comprising in combination a platen, a pivot member, a plurality of type levers freely mounted on said pivot member in cooperative relation with said platen, means for sensing one column of a record card, means for traversing a record card column by column past said sensing means and over said platen, means for causing an operation of the sensing means between each movement of the traversing means, means operative under the control of said sensing means when sensing any hole within a predetermined range of hole positions in a column, to select for operation a corresponding type lever, means operative under the control of said sensing means when sensing a control hole in the same column, to shift the pivot for the type levers so that, when the selected type lever operates, a different character strikes the printing surface, and means for actuating the selected type lever, all said type levers being so disposed relatively to the sensing means that any type lever selected for operation under the control of the sensing means prints in the same column of the record as that of which the sensing caused selection of the operative type lever.

RICHARD EVEREST BALDWIN.